US009749934B2

(12) United States Patent
Chu et al.

(10) Patent No.: US 9,749,934 B2
(45) Date of Patent: *Aug. 29, 2017

(54) SYSTEMS AND METHODS FOR INTEGRATING WIRELESS LOCAL AREA NETWORKS ON EXTENDED BRIDGES (71) Applicant: Dell Products L.P., Round Rock, TX (US)

(72) Inventors: Wenjing Chu, Saratoga, CA (US); Snigdhendu S. Mukhopadhyay, San Jose, CA (US); Saikrishna M. Kotha, San Jose, CA (US); Rabah Hamdi, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,097

(22) Filed: Sep. 23, 2016

(65) Prior Publication Data
US 2017/0013544 A1   Jan. 12, 2017

Related U.S. Application Data (63) Continuation of application No. 14/099,743, filed on Dec. 6, 2013, now Pat. No. 9,473,425.

(51) Int. Cl.
H04W 48/14 (2009.01)
H04L 12/931 (2013.01)
H04L 12/66 (2006.01)
H04W 84/12 (2009.01)
H04W 92/12 (2009.01)
H04W 88/08 (2009.01)

(52) U.S. Cl.
CPC ............. *H04W 48/14* (2013.01); *H04L 12/66* (2013.01); *H04L 49/351* (2013.01); *H04L 49/45* (2013.01); *H04W 84/12* (2013.01); *H04W 88/08* (2013.01); *H04W 92/12* (2013.01)

(58) Field of Classification Search
CPC ....... H04L 49/45; H04L 49/351; H04L 12/66; H04W 84/12; H04W 92/12; H04W 92/14; H04W 48/14; H04W 88/08
See application file for complete search history.

(56) References Cited

U.S. PATENT DOCUMENTS

2008/0240104 A1   10/2008 Villait et al.
2009/0234985 A1*  9/2009 Maxwell ............. G06F 13/4022
                                                  710/33

(Continued)

*Primary Examiner* — Paul H Masur
(74) *Attorney, Agent, or Firm* — Haynes and Boone, LLP (57) ABSTRACT An information handling system is provided herein. The information handling system includes a controlling bridge having a plurality of bridge ports and at least one port extender coupled to one of the bridge ports of the controlling bridge to form an extended bridge. The port extender has a plurality of extension ports. The information handling system further includes an access point coupled to the port extender such that a wireless association between the access point and one or more stations appears as a logical bridge port to the controlling bridge and to an access controller system. The access point has a wireless transceiver to communication with the one or more stations. Associated methods are provided herein for providing wireless network access to a local area network.

20 Claims, 6 Drawing Sheets (56) References Cited

U.S. PATENT DOCUMENTS

| | | |
|---|---|---|
| 2013/0083691 A1 | 4/2013 | Murphy et al. |
| 2013/0322457 A1 | 12/2013 | Budhia et al. |
| 2014/0044129 A1 | 2/2014 | Mentze et al. |
| 2014/0126466 A1 | 5/2014 | Hamdi et al. |
| 2014/0129714 A1 | 5/2014 | Hamdi et al. |
| 2014/0146806 A1 | 5/2014 | Liu et al. |
| 2014/0177641 A1 | 6/2014 | Kalkunte et al. |
| 2014/0269710 A1 | 9/2014 | Sundaram et al. |
| 2014/0344799 A1 | 11/2014 | Thodati et al. |
| 2015/0339249 A1 | 11/2015 | Dharmadhikari et al. |

* cited by examiner

SYSTEMS AND METHODS FOR INTEGRATING WIRELESS LOCAL AREA NETWORKS ON EXTENDED BRIDGES

CROSS REFERENCED APPLICATION

The present application is a continuation of U.S. patent application Ser. No. 14/099,743, filed on Dec. 6, 2013, which is incorporated by reference in its entirety.

BACKGROUND

1. Technical Field

The present disclosure is related to information handling systems. In particular, embodiments disclosed herein are related to providing a wireless local area network.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For many years, network access in the enterprise or in the campus was provided exclusively by wired connections. With the advent of portable computers, wireless networking became increasingly popular as a means to access a local area network and the Internet. As increasingly portable devices like tablets, smart phones, and wearable computers like glasses and watches, have become ubiquitous the use of wireless networks, such as IEEE 802.11 wireless Local Area Networks, has increased dramatically. The current trends toward BYOD (bring your own device) in the enterprise has increased the reliance on a wireless and underscored the needs for expanding wireless network capacity, network management, and security. Current approaches to meeting wireless local area needs have not been entirely satisfactory. Additionally, the continued trend toward wireless networks is likely to exacerbate the existing difficulties in wireless LAN provision and maintenance.

SUMMARY

Consistent with some embodiments, there is provided an information handling system. The information handling system includes a controlling bridge having a plurality of bridge ports and at least one port extender coupled to one of the bridge ports of the controlling bridge to form an extended bridge. The port extender has a plurality of extension ports. The information handling system further includes an access point coupled to the port extender such that a wireless association between the access point and one or more stations appears as a logical bridge port to the controlling bridge and to an access controller system. The access point has a wireless transceiver to communication with the one or more stations.

Consistent with some embodiments, there is further provided a method of providing wireless network access to a local area network (LAN). The method includes steps of receiving a request to join the LAN from a station at an access point in the LAN and of communicating the request from the access point to a controlling bridge of an extended bridge through at least one port extender, the port extender communicating with the access point so that the access point is a logical port on the controlling bridge. The method further includes steps of communicating the request from the controlling bridge to an access controller, of granting the request from the station, and of receiving frames from the station on the logical port of the controlling bridge.

Consistent with yet other embodiments, there is provided a method of providing wireless network access to a local area network (LAN). The method includes steps of receiving a frame on a controlling bridge, the controlling bridge being coupled to at least one port extender by a bridge port and forming an extended bridge. The at least one port extender provides a plurality of extended ports that function as logical ports on the controlling bridge. The method includes steps of identifying a tag in the frame that identifies a logical port on the controlling bridge, of transmitting the frame to the logical port, and of communicating the frame to an access point coupled to an extended port providing the logical port. The access point appearing to an access controller coupled to the controlling bridge as a wireless port. Additionally, the method includes a step of wirelessly transmitting the frame from the access point to a station.

These and other embodiments will be described in further detail below with respect to the following figures.

BRIEF DESCRIPTION OF THE DRAWINGS

FIG. 3 is a diagram of an information handling system that provides wireless

LAN access according to additional aspects of the present disclosure.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, any other physical medium, RAM, PROM, EPROM, FLASH-EPROM, any other memory chip or cartridge, and/or any other medium from which a processor or computer is adapted to read.

Figure 1A:
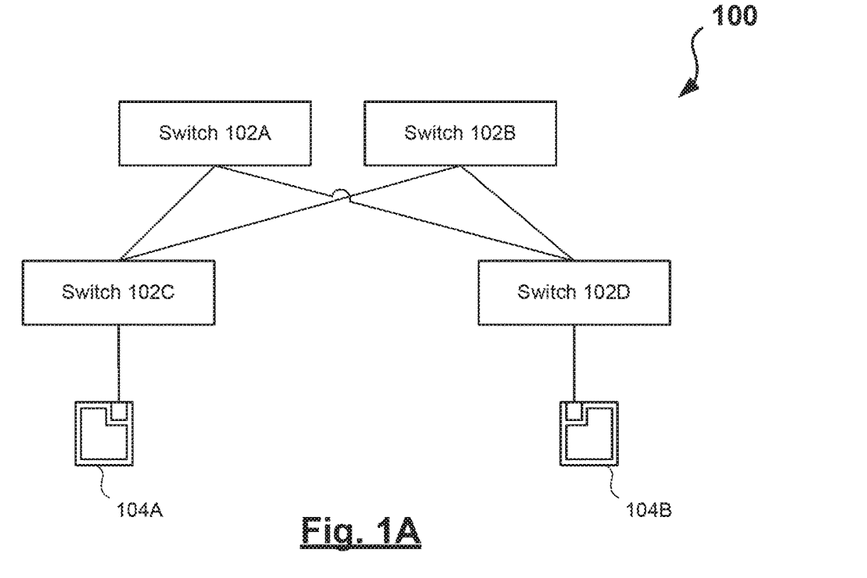
FIG. 1A is a diagram of a layer two information handling system having independent access points.

FIG. 1A depicts an information handling system 100 that includes several layer 2 network devices. As illustrated in FIG. 1, the information handling system 100 includes four switches. The switch 102A is coupled to switches 102C and 102D, as is a switch 102B. The switches 102C and 102D are each coupled to an access point. An access point 104B is coupled to the switch 104C, and an access point 104B, when working together with a Distribution System, is coupled to the switch 102D. Together, the access points 104A and 104B provide an extended service set, or ESS. Each of the access points 104A and 104B includes a wireless transceiver to be able to wirelessly communicate with one or more stations. The stations are computing devices such as desktops with wireless networking cards, laptops, tablets, smartphones, or other devices needing to communicate wirelessly. The information handling system 100 may provide wireless LAN access to stations within range.

The information handling system 100 allows each access point to function independently in providing wireless LAN access. This may make wireless access to the LAN difficult to manage and difficult to secure, and may increase the difficulty of supporting station roaming between access points.

Figure 1B:
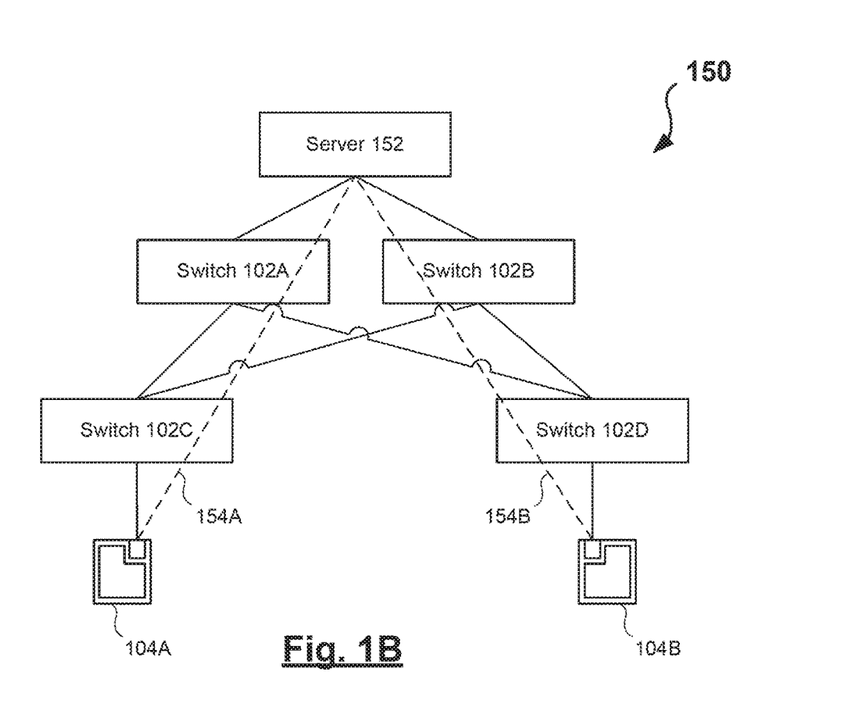
FIG. 1B is a diagram of a layer 3 overlay in an information handling system to provide wireless LAN access.

FIG. 1B is an illustration of an information handling system 150 that may be used in place of the information handling system 100 of FIG. 1. Like the information handling system 100, information handling system 150 includes several network gateway devices. These devices include a switch 102A, a switch 102B, the switch 102C, and a switch 102D. Again, an access point 104A is coupled to the switch 102C, and an access point 104B is coupled to the switch 102D. The information handling system 150 further includes a layer 3 network device, illustrated as a server 152. The server 152 may provide an access controller to the information handling system 150. In order to facilitate centralized management of the ESS, overlay tunnels are configured between the access points 104A and 104B and the router 152. The access points 104A and 104B may provide encapsulation into the overlay network provided by the tunnels.

While the information handling system 150 may facilitate deployment of management of wireless LAN access in an enterprise or campus setting, the management is separated from the underlying layer 2 network, and traffic must be funneled through a gateway which may be difficult to scale and may be less robust than other information handling systems.

Figure 2:
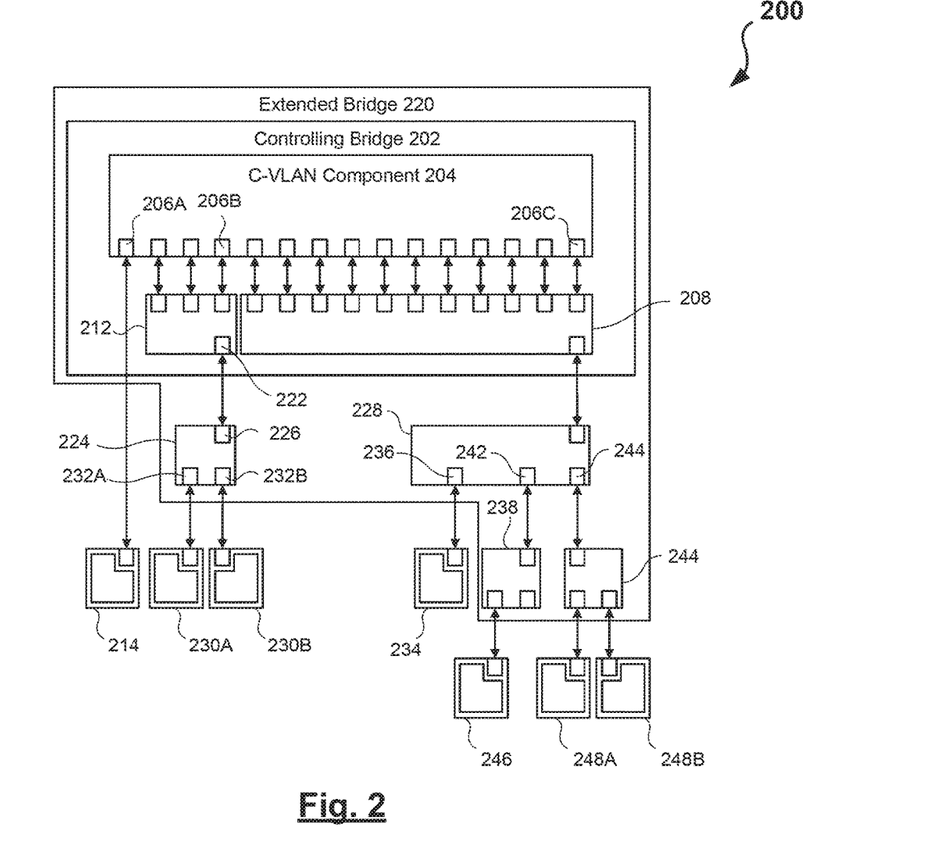
FIG. 2 is a diagram of an information handling system that provides wireless LAN access according to aspects of the present disclosure.

FIG. 2 is a diagram of an information handling system 200 that may be used to provide wireless access to a local area network. The information handling system 200 includes a plurality of network devices. As illustrated, the information handling system 200 includes a controlling bridge device 202. The controlling bridge device 202 includes a customer virtual local area network (C-VLAN) component 204 having a plurality of ports thereon, including exemplary ports 206A, 206B, and 206C. The C-VLAN component 204 may be coupled to a number of different network devices by the plurality of ports. As illustrated, the component 204 is coupled by the exemplary port 206C to an internal bridge port extender 208. The internal bridge port extender 208 is provided in a controlling bridge housing 210. The exemplary port 206B is also coupled to an internal bridge port extender 212. The exemplary port 206C is coupled to a station or end station 214. The controlling bridge 202 may function as a traditional switch in providing bridging functions. As illustrated in FIG. 2, the controlling bridge 202 is configured as an extended bridge 220. Thus, the controlling bridge 202 may implement an extended bridging protocol such as the IEEE 802.1BR standard.

As illustrated, the extended bridge 220 includes a plurality of external bridge port extenders. The internal port extender 212 includes a cascade port 222 which is coupled to an external port extender 224 by a cascade port 226 thereof. The external port extender 224 couples the extended bridge 220 to stations 230A and 230B by extended ports 232A and 232B, respectively. By the use of tagging, the extended ports 232A and 232B function as logical ports belonging to the controlling bridge 202 within the information handling system 200. The tags in frames transmitted within the information handling system 200 may include an E-TAG as described in the 802.1BR standard. Particularly, the tags may be used at cascade ports and upstream ports, the ports connecting one port extender to another, to correctly transmit frames through the extended bridge 220.

The internal port extender tip 208 is similarly coupled to an external port extender 228, which is coupled to a station 234 by an extended port 236 and to external port extenders 238 and 240 by cascade ports 242 and 244 of the external port extender 228. The external port extender 238 is coupled to a station 246, while the port extender 240 is coupled to a station 248A and a station 248B. Thus, the external port extenders 226, 228, 238, and 240 provide a plurality of extended ports to the extended bridge 220. These extended ports appear to devices coupled to the information handling system 200 as ports on the controlling bridge 202. Embodiments of the information handling system 200 may include many more ports on the controlling bridge 202 on internal port extenders and on external port extenders. Additionally, embodiments of the information handling system 200 may include many more port extenders, such that the extended bridge 202 may include hundreds or thousands of extended ports that appear as logical ports on the controlling bridge 202.

As illustrated in FIG. 2, each of the stations 214, 230A, 230B, 234, 246, 248A, and 248B may be wireless access points. In some embodiments, all of the stations are wireless access points. The wireless access points provided by the stations in the information handling system 200 each include a transceiver to communicate with wireless devices.

The cascading port extenders and the controlling bridge 202 in the information handling system 200 provide a centrally managed LAN bridge. The information handling system 200 may provide simplified, central management. Physically, the information handling system 200 may be simple to build and to upgrade as ensuring that ports are properly connected comprises a majority of setup work.

Figure 3:
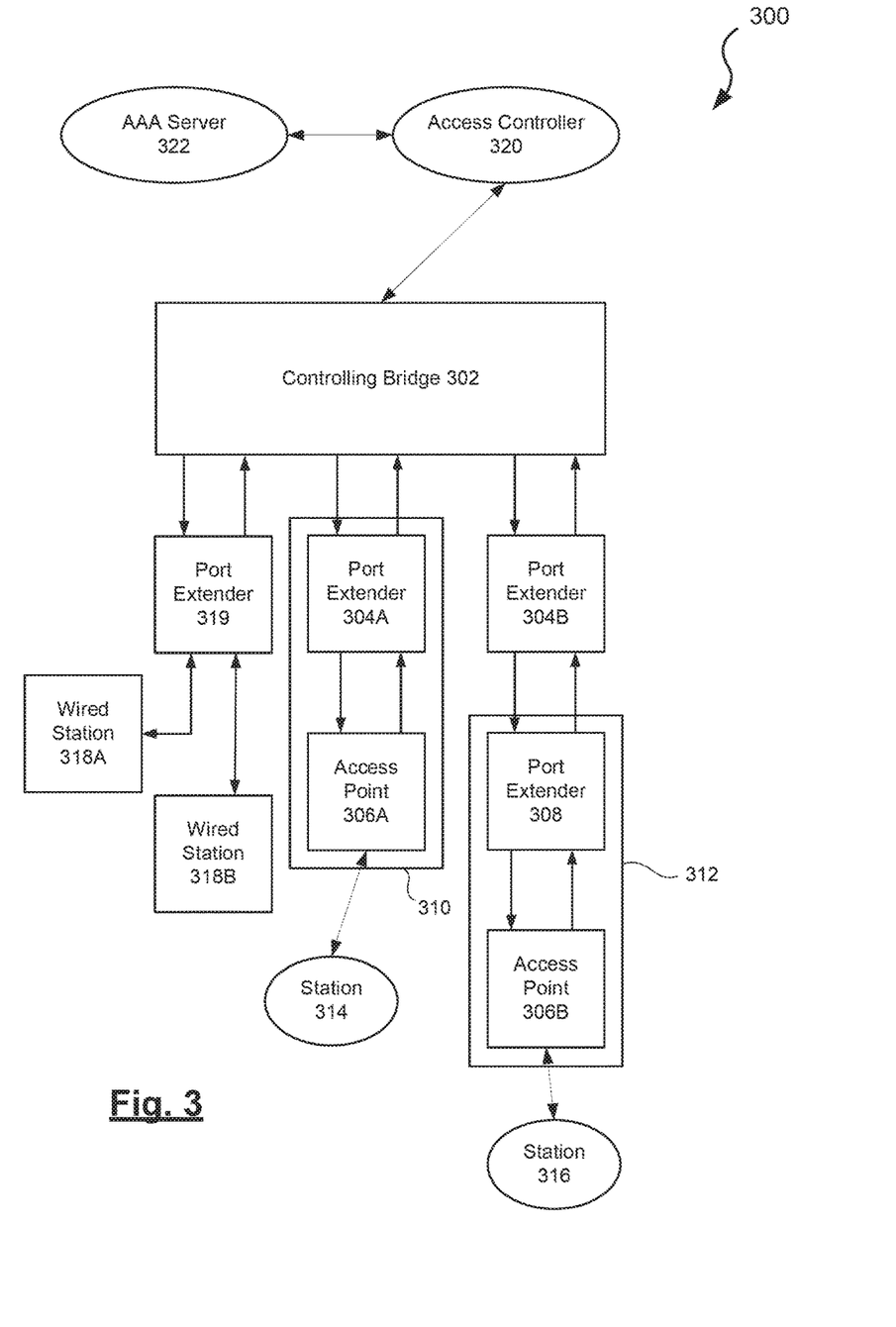

FIG. 3 is a diagram of an information handling system 300, which may be understood as including the information handling system 200 of FIG. 2. Thus, the information handling system 300 includes a controlling bridge 302 which is coupled to port extenders 304A and 304B forming an extended bridge. The port extender 304A is coupled to an access point 306A, while the port extender 304B is coupled to an access point 306B. An additional port extender 308 is coupled between the port extender 304B and the access point 306B and is also part of the extended bridge. Thus, the access point 306B may be similar to the access point 248A of FIG. 2, while the access point 306A is similar to the access point 230A, also of FIG. 2.

As illustrated in FIG. 3, the port extender 304A and the access point 306A are provided in a device housing 310, and the port extender 308 and the access point 306B are provided in another device housing 312. In some embodiments, each of those devices may be provided in a separate housing. The various components of the information handling system 300 may be spread across a campus or an enterprise facility. For example, the port extender 308 may be in a first building or site a half mile away from the controlling bridge 302, which is in another site. Thus, wireless access to a LAN may be provided over a wide area with gapless coverage. This may allow for roaming by the stations 314 and 316, or switching between access points while in use.

For example, the access points 306A and 306B may be disposed in a single building on opposite ends of the building. An employee may carry a smartphone (station 316) and walking from one end of the building to the other while streaming a video. As the employee leaves the coverage area of the access point 306A and enters a coverage area provided by the access point 306B, the smartphone may be handed off from the access point 306B to the access point 306A without disrupting the streamed video.

As illustrated in FIG. 3, the information handling system 300 also includes a plurality of wired stations, such as wired desktop computers, servers, etc. The information handling system 300 includes a wired station 318A and a wired station 318B coupled to the controlling bridge 302 by a port extender 319. The controlling bridge 302 facilitates communication between the wired stations 318A and 318B and between the wireless stations 314 and 316. In some embodiments, wired stations coupled directly to the controlling bridge 302 may be included in the information handling system 300.

The information handling system 300 further includes an access controller 320 that provides management for the extended bridge provided by the controlling bridge 302 and the port extenders. The extended ports 304A, 304B, and 308 provided by the port extenders may appear to the access controller 320 as ordinary ports. The access controller 320 that is provided by management software running on a coupled network device such as a switch, a router, a combination device, or a server. The access controller 320 may provide a graphical user interface for a network administrator. The management system provided by the access controller 320 automatically acknowledges and represents the access points as ports on the system.

As illustrated, the information handling system 300 further includes an authentication, authorization, and accounting (AAA) server 322. The access controller 320 and/or the AAA server 322 maybe in communication with a database for checking identifiers, passwords, and other credentials to ensure the access to the LAN is controlled as desired. For example, a policy may be implemented by the access controller such that certain devices or types of devices may be prohibited from accessing certain files or databases. As another example, a policy may restrict access based on an identity of the user, rather than, or in addition to an identity or type of a device. The associated information may be stored proximate the access controller 320, which may be more easily secured than the wireless access points of a wireless LAN. In communicating with the access points, like the access points 306A and 306B, the access points appear to the access controller 320 as ports on the controlling bridge 302. This may greatly simplify communication, allowing for fast hand-offs between access points in the information handling system 300.

In some embodiments of the information handling system 300, more than one system like the information handling system 200 is provided. Thus, in such embodiments, more than one controlling bridge 302 is present. In such an embodiment, the controlling bridges may be coupled together to provide redundancy. For example, the controlling bridges may be coupled by an interconnect link, implementing a virtual link trunk (VLT), and when one controlling bridge fails the other may become active.

Figure 4:
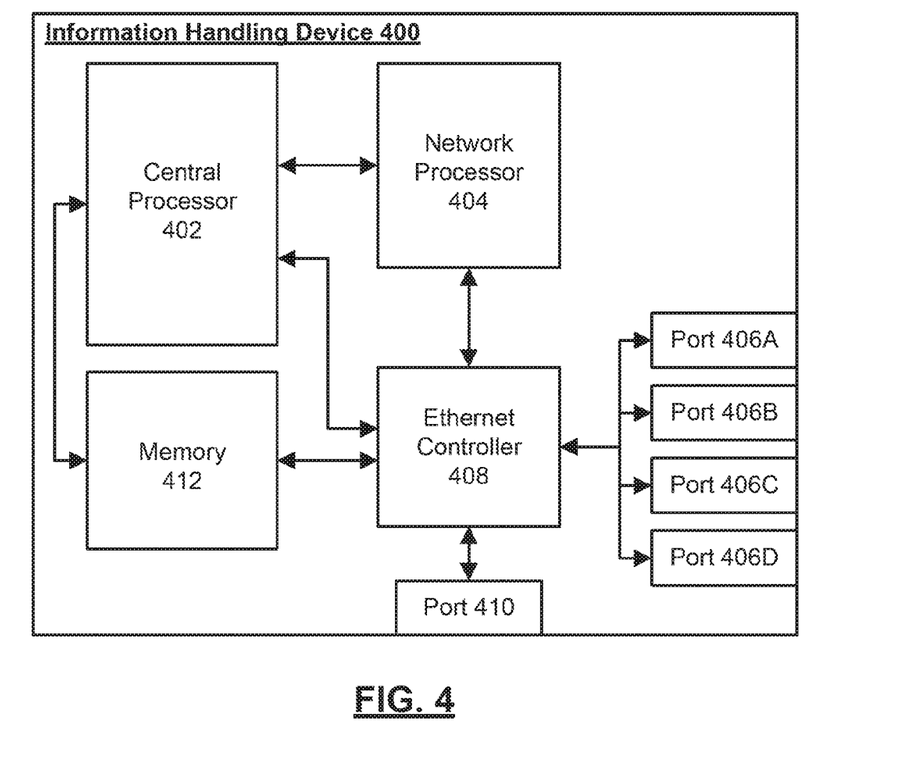
FIG. 4 is a diagram of an information handling device according to aspects of the present disclosure.

FIG. 4 is of a diagram of an information handling device 400. The information handling device 400 provides an example of the network devices disclosed in information handling systems 200 and 300 as seen in FIGS. 2 and 3 and described above. The illustrated embodiment of the information handling device 400 includes a central processor 402 in communication with a network processor 404. For example, the network processor 404 may be part of a network interface card (NIC) in communication a plurality of ports 406A, 406B, 406C, and 406D through an Ethernet controller 408. Some embodiments of the information handling device 400 may include more or fewer ports than illustrated. The central processor 402 may also communicate with the Ethernet controller 408, which may be in communication with the ports 406A-D and/or with a dedicated port 410.

The information handling device 400 further includes a memory 412. The memory 412 may include multiple types and/or levels of memory. Thus, embodiments of the information handling device 400 may include RAM, ROM, a hard disk drive, a solid-state drive, and/or other types of memory. The memory 412 store computer programs or software such as an operating system and software program providing management of an extended bridge. For example, the memory 412 may store a program providing the access controller 320 running on network device such as a server or router. The network processor 404 and/or the Ethernet controller 408 may identify tags in received frames. Thereby, tags such as the E-TAG described above in connection with the 802.1BR standard may be processed appropriately. Embodiments of the information handling device 400 may provide the access controller 320, the AAA server 322, the controlling bridge 302, the port extenders 304A, 304B, and 308, and the stations 314 and 316 of FIG. 3.

Figure 5:
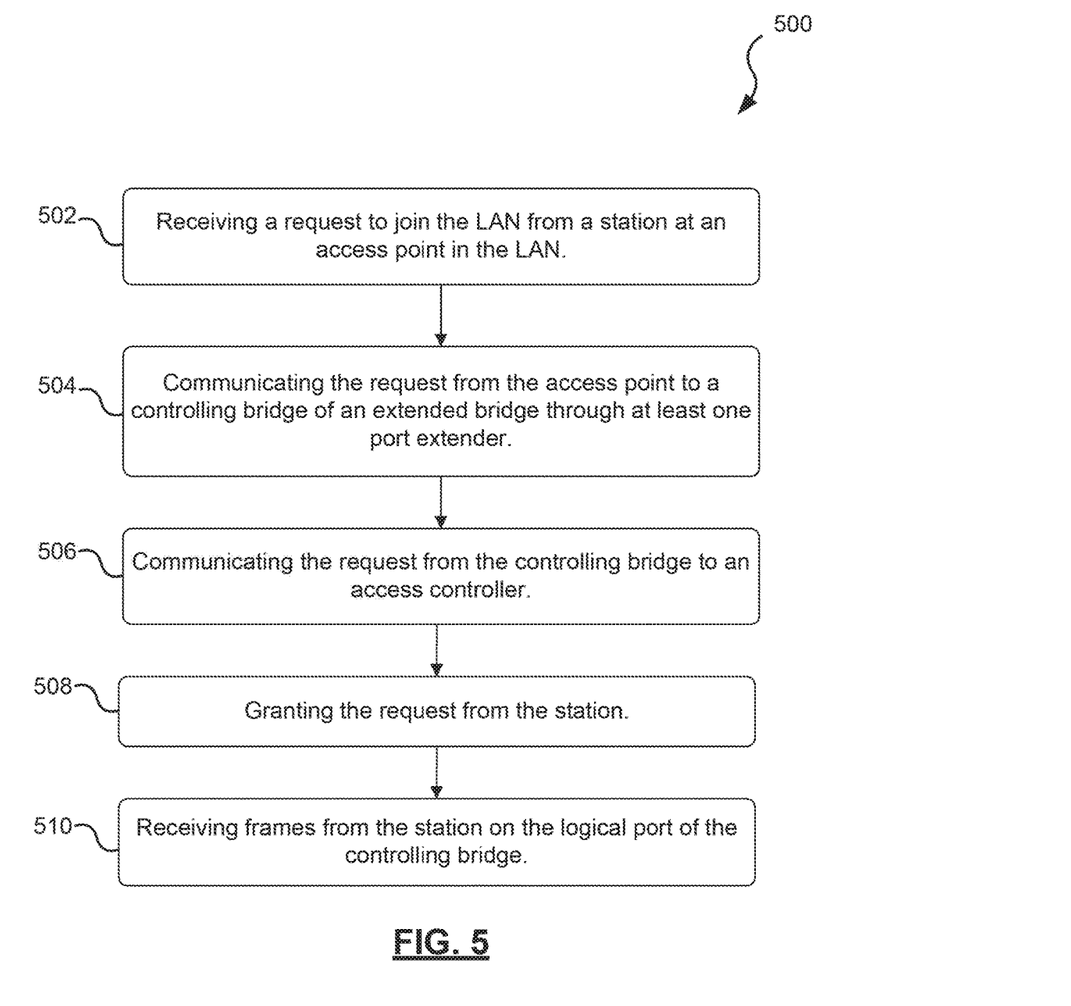
FIG. 5 is a flowchart of a method of providing wireless network access to a two local area network according to aspects of the present disclosure.

FIG. 5 is a flowchart of a method 500 of providing wireless network access to a LAN. As illustrated in FIG. 5, the method 500 includes several enumerated steps. Embodiments of the method 500 may include additional steps before, after, in between, and/or as subparts of the enumerated steps. As illustrated, the method 500 may begin in step 502 in which an access point receives a request from a station to join the LAN. In step 504, the request from the access point is communicated to a controlling bridge of an extended bridge through at least one port extender. The port extender communicates with the access point so that the access point is a logical port on the controlling bridge. In step 506, a controlling bridge communicates the request or information from a request to an access controller. Assuming that policies enforced by the access controller permit the station to access the LAN, in step 508, the request from the station is granted. In step 510, the station sends frames into the LAN that are received on the controlling bridge on a logical port thereof.

To better describe the method 500, reference will be made to the information handling system 300 of FIG. 3. The station 316, which may be a smartphone, sends a request to join the LAN that is received by the access point 306B (step 502). The access point 306B communicates the request to the controlling bridge 302 (step 504). This request and associated information passes through the port extender 308 and the port extender 304B. The access point 306B is coupled to an extended port of the port extender 308. The extended port and others provided by the port extenders 308, 304B, and 304A, are ports on an extended bridge formed by the controlling bridge 302 and the port extenders, which may communicate according to the 802.1BR standard. Thus, the extended port functions as a logical port on the controlling bridge 302 so that the access point 306B appears as a wireless, physical port on the controlling bridge to other network devices.

Such other network devices include the access controller 320 or the device on which the access controller 320 runs. The controlling bridge 302 communicates the request to the access controller 320 to determine whether the station 316 should be granted access to the LAN (step 506). The request sent by the station 316 may include information about the station 316. For example, the request may include an identifier of the station, such as a media access control (MAC) address, an identifier of the user of the station such as a login ID, a password, and other credentials upon which access to a network may be granted and/or limited. In some embodiments, the access controller 320 communicates with the AAA server 322 to review the credentials and determine what level of access should be granted to the station 316 according to the credentials. In some instances, the station 316 may receive access to the LAN but may not receive access to a wider area network coupled to the LAN, such as a wider campus area network or the Internet. Thus in some embodiments, the station 316 may be authorized by the access controller 320 to received frames from the Internet through the LAN.

In this way an information handling system 300 may authenticate a new station joining the network by forming a wireless association with an access point. During use, when a station is physically moving away from one access point and toward another, the steps of the method 500 may be repeated to authenticate the device by way of the access point to which the device roams. This authentication may be performed rapidly to allow the continued flow of data to the station while roaming.

Figure 6:
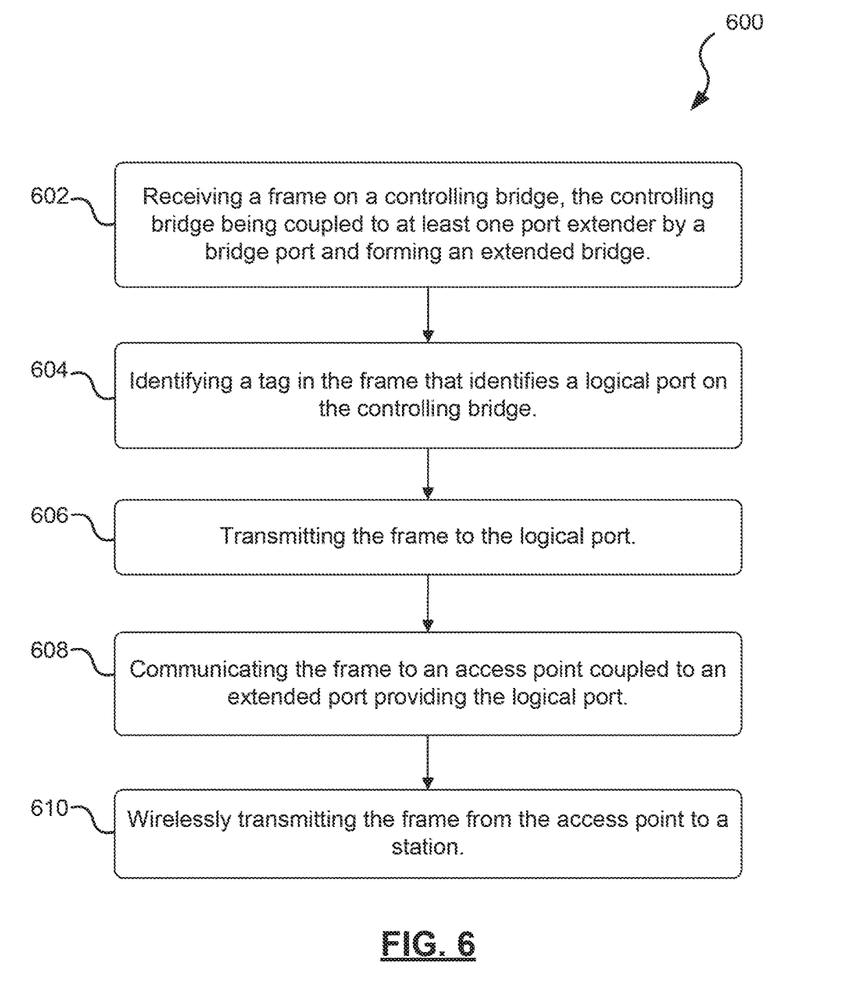
FIG. 6 is a flowchart of an additional method for providing wireless network access to a local area network according to aspects of the present disclosure.

FIG. 6 is a flowchart of an additional method 600 of providing wireless network access to a LAN. As illustrated, the method 600 includes several enumerated steps, but embodiments of the method 600 may include additional steps before, after, in between, and/or as part of the enumerated steps. Thus, an embodiment of the method 600 may begin in step 602 in which a controlling bridge receives a frame. The controlling bridge is coupled to at least one port extender by a bridge port, thereby forming an extended bridge. The least one port extender provides a plurality of extended ports that function as logical ports on the controlling bridge. In step 604, a tag in the frame is identified. The tag identifies a logical port on the controlling bridge. In step 606, the frame is transmitted by the controlling bridge to the identified logical port. In step 608, the frame is communicated to an access point coupled to the extended port providing the logical port. The access point appears to an access controller coupled to the controlling bridge as a physical, wireless port. In step 610, the frame is wirelessly transmitted from the access point to a station.

Again, to better describe the method of 600, reference is made herein to the information handling system 300 of FIG. 3. Thus, as an example an embodiment of the method 600 may begin when the controlling bridge 302 receives a frame (step 602). The frame may be received from another host or device coupled to the LAN. For example, the frame may be received from the wireless station 314 or from the wired stations 318A and 318B. The device may be part of the LAN or may be part of a wider area network coupled to the LAN. The controlling bridge 302 inspects the received frame, and identifies a tag that conforms to the 802.1BR standard, such as an E-TAG (step 604). The tag indicates to the controlling bridge 302 which logical port is the destination port of the frame. The controlling bridge 302 transmits the frame to the extended port that provides the logical port indicated by the tag (step 606). For example, the logical port may be provided to the controlling bridge 302 by an extended port on the port extender 308. The port extender 308 may communicate the frame to the access point 306B in communication that conforms to the IEEE 802.3 standard (step 608). The access point 306B wirelessly transmits the frame to a wireless device providing the station 316. This may done according to an IEEE 802.11 standard or another wireless standard.

Some embodiments of information handling systems 200 and 300 may include tangible, non-transient, machine-readable media that include executable code that when run by a processor, such as central processor 402 of information handling device 400 in FIG. 4, may cause the processor to perform some or all of the steps of methods 500 and 600 as described above. In some instances multiple information handling devices, or network devices, may execute code stored on such machine-readable media to perform the steps of methods 500 and 600. Some common forms of machine-readable media that may include the steps of method 500 and/or 600 are, for example, floppy disk, flexible disk, hard disk, magnetic tape, any other magnetic medium, CD-ROM, any other optical medium, any other physical medium, RAM, PROM, EPROM, FLASH-EPROM, any other memory chip or cartridge, and/or any other medium from which a processor or computer is adapted to read. The machine-readable media may be memory 406 of FIG. 4.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
    a first controlling bridge including one or more bridge ports;
    a first port extender comprising a first extended port and coupled to one of the bridge ports of the first controlling bridge; and
    a wireless access point coupled to the first extended port, the first extended port and the wireless access point forming a first logical bridge port of the first controlling bridge;
    wherein the first controlling bridge, the first port extender, and the wireless access point appear as an integrated extended service set (ESS).

2. The information handling system of claim 1, further comprising:
    a second access point; and
    a second port extender coupled to the first controlling bridge, the second port extender including a second extended port coupled to the second access point.

3. The information handling system of claim 2, wherein the first controlling bridge and the second port extender are coupled such that the second extended port of the second port extender provide a second logical bridge port.

4. The information handling system of claim 1, wherein the first extended port and the wireless access point appear to a first wired station coupled to the first controlling bridge as the first logical bridge port on the first controlling bridge.

5. The information handling system of claim 4, wherein the first extended port and the wireless access point appear as the first logical bridge port on the first controlling bridge by tagging frames transmitted within the information handling system.

6. The information handling system of claim 5, wherein the frames are tagged according to the 802.1BR standard.

7. The information handling system of claim 1, further comprising a second controlling bridge coupled to the first controlling bridge by an interconnect link, the first and second controlling bridges forming a virtual link trunk (VLT).

8. The information handling system of claim 1, further comprising an access controller coupled to the first controlling bridge and configured to enforce policies of the information handling system.

9. A method of providing wireless network access to a local area network (LAN), the method comprising:
    receiving a request to join the LAN from a station at an access point in the LAN;
    communicating the request from the access point to a first controlling bridge of an extended bridge through a first port extender, the first port extender comprising a first extended port, wherein the first extended port and the access point form a first logical port of the first controlling bridge;
    communicating the request from the first controlling bridge to an access controller;
    granting, by the access controller, the request from the station; and
    receiving frames from the station on the first logical port of the first controlling bridge;
    wherein the first controlling bridge, the first port extender, and the access point appear as an integrated extended service set (ESS).

10. The method of claim 9, wherein receiving the request from the access point comprises receiving an identifier of the station and receiving a credential from the station.

11. The method of claim 9, further comprising communicating, by the access controller, an identifier and a credential of the station to an authentication, authorization, and accounting (AAA) server.

12. The method of claim 9, wherein the frames received on the first logical port of the first controlling bridge appear to the access controller as if received on a physical port of the first controlling bridge.

13. The method of claim 9, further comprising implementing, by the access controller, a policy to restrict access to the LAN based on one or more of an identity of a user, an identity of a device, or an identity of a type of device.

14. The method of claim 9, further comprising identifying a tag included in each of the frames, wherein the tag identifies the first logical port of the first controlling bridge on which a respective frame was received.

15. A method of providing wireless network access to a local area network (LAN), the method comprising:
    receiving a frame at a first controlling bridge, the first controlling bridge being coupled to a first port extender by a bridge port, the first port extender providing a first extended port that functions as a logical port on the first controlling bridge;
    identifying, by the first controlling bridge, a tag in the frame that identifies the logical port on the first controlling bridge;
    transmitting, by the first controlling bridge, the frame to the logical port on the first controlling bridge;
    forwarding the frame to a first access point coupled to the first extended port, the first access point appearing to an access controller coupled to the first controlling bridge as a wireless port; and
    wirelessly transmitting the frame from the first access point to a station;
    wherein the first controlling bridge, the first port extender, and the first access point appear as an integrated extended service set (ESS) to the station.

16. The method of claim 15, wherein the frame is tagged according to the 802.1BR standard.

17. The method of claim 15, wherein the first controlling bridge is coupled to a second port extender, and wherein identifying the tag indicates to which of the first port extender and the second port extender the frame should be transmitted.

18. The method of claim 15, wherein the first port extender is coupled to an additional port extender, such that the first access point is coupled to the first controlling bridge through the first port extender and the additional port extender.

19. The method of claim 15, wherein the first controlling bridge is coupled to a second controlling bridge by an interconnect link, the first and second controlling bridges forming a virtual link trunk (VLT).

20. The method of claim 19, further comprising, when the first controlling bridge fails, activating the second controlling bridge, wherein the second controlling bridge, a second port extender coupled to the second controlling bridge, and a second access point coupled to the second port extender appear as a second integrated ESS to the station.

* * * * *